US011762379B2

(12) United States Patent
Shelar et al.

(10) Patent No.: US 11,762,379 B2
(45) Date of Patent: Sep. 19, 2023

(54) AUTOMATIC FAULT DETECTION AND DIAGNOSTICS IN A BUILDING MANAGEMENT SYSTEM

(71) Applicant: Johnson Controls Tyco IP Holdings LLP, Milwaukee, WI (US)

(72) Inventors: Mohan Jagannath Shelar, Pune (IN); Raj Kumar Jha, Gurgaon (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/032,853

(22) Filed: Sep. 25, 2020

(65) Prior Publication Data

US 2021/0096557 A1    Apr. 1, 2021

(30) Foreign Application Priority Data

Sep. 26, 2019   (IN) .............................. 201921038949

(51) Int. Cl.
*G05B 23/02* (2006.01)
*G05B 19/042* (2006.01)

(52) U.S. Cl.
CPC ....... *G05B 23/0259* (2013.01); *G05B 19/042* (2013.01); *G05B 2219/25011* (2013.01)

(58) Field of Classification Search
CPC .............. G05B 23/0259; G05B 19/042; G05B 2219/25011
See application file for complete search history.

(56) References Cited

U.S. PATENT DOCUMENTS

| 10,976,068 | B2   | 4/2021  | Hallendy et al. |           |
|------------|------|---------|-----------------|-----------|
| 2011/0055748 | A1* | 3/2011 | Vacariuc ............... | G05B 15/02 |
|            |      |         |                 | 715/771   |
| 2011/0071685 | A1  | 3/2011  | Huneycutt et al. |           |
| 2012/0022700 | A1* | 1/2012 | Drees ................ | H02J 13/00004 |
|            |      |         |                 | 705/412   |
| 2014/0325291 | A1* | 10/2014 | Spivey ............... | G05B 23/0213 |
|            |      |         |                 | 714/48    |
| 2017/0308045 | A1* | 10/2017 | Dibowski ............. | G05B 15/02 |
| 2017/0343970 | A1* | 11/2017 | Meruva .................. | H04L 67/12 |

* cited by examiner

*Primary Examiner* — Christopher E. Everett
*Assistant Examiner* — Christopher W Carter
(74) *Attorney, Agent, or Firm* — Foley & Lardner LLP

(57) ABSTRACT

A system for automatic application of fault detection and diagnostics (FDD) rules within a building management system (BMS) includes a memory having instructions stored thereon and a processor configured to execute the instructions. The processor, in executing the instructions, may retrieve from a plurality of BMS devices, a first BMS device having at least one attribute. The processor may identify, from a plurality of FDD rules based on the at least one attribute, an FDD rule associated with the at least one attribute. The processor may apply the FDD rule to the data point of the first BMS device corresponding to the at least one attribute. The processor may, responsive to determining a second BMS device from the plurality of BMS devices shares the at least one attribute, automatically apply the FDD rule to the second BMS device.

20 Claims, 8 Drawing Sheets

FDD Section

| FDD Name | FDD Description | Auto Applied | Mapped Equip | Priority | Category | Tag | Fault Reprocessing | Last modified | Revision | Disable | False positive |
|---|---|---|---|---|---|---|---|---|---|---|---|
| AHU-FD-001 High Return Air humidity | Detect high return air humidity by comparing with set line. | Yes | ☒ | Medium | Comfort | Global | ☒ | 28-01-2019 12:43 | 3 | ⊙ | ⊖ |
| AHU-FD-002 High Static Pressure | Detect high supply air static pressure by comparing with | Yes | ☒ | Critical | Energy | Global | ☒ | 28-01-2019 12:43 | 3 | ⊙ | ⊖ |
| AHU-FD-003 High Supply Air Temperature in Cooling Mode | High Supply Air Temperature in Cooling Mode | Yes | ☒ | Medium | Comfort | Global | ☒ | 28-01-2019 12:43 | 2 | ⊙ | ⊖ |
| AHU-FD-004 Low Static Pressure | Detects low static air pressure comparing with set limit | Yes | ☒ | Medium | Comfort | Global | ☒ | 28-01-2019 12:43 | 2 | ⊙ | ⊖ |
| AHU-FD-005 Low Supply Air Temperature in Heating Mode | When AHU is in operation and operating in heating mode | Yes | ☒ | Medium | Comfort | Global | ☒ | 29-01-2019 09:00 | 4 | ⊙ | ⊖ |
| AHU-FD-006 Poor Indoor Air Quality | Detects air quality based on carbon dioxide value | Yes | ☒ | High | Comfort | Global | ☒ | 28-01-2019 09:00 | 4 | ⊙ | ⊖ |
| AHU-FD-007 Supply Air Flow Less Than Set Value | Supply air flow less than 40% of its set point value | Yes | ☒ | Medium | Comfort | Global | ☒ | 28-01-2019 09:00 | 1 | ⊙ | ⊖ |
| AHU-FD-008 Determine if Supply Air Humidity sensor is Faulty | Determine if Supply Air Humidity sensor is Faulty | No | ☒ | High | Comfort | Custom | ☒ | 30-01-2019 12:50 | 0 | ⊙ | ⊖ |
| AHU-FD-009 Determine if Supply Air Temperature sensor is Faulty | Determine if Supply Air Humidity sensor is Faulty | No | ☒ | Low | Comfort | Custom | ☒ | 28-01-2019 12:50 | 0 | ⊙ | ⊖ |
| AHU-FD-010 After Hour Operation | Determine if Supply Air Humidity sensor is Faulty | No | ☒ | Low | Energy | Custom | ☒ | 28-01-2019 12:50 | 0 | ⊙ | ⊖ |

Regenerate FDDs

FIG. 5

| Report Name | Report Description | Progress | Last Generated | User | Recipient Group | Rev | Periodic Setup |
|---|---|---|---|---|---|---|---|
| Missing Eqp & Pt Rpt ← 602 | FDD wise missing equipment/points | 50% ⊗ | 29-01-2019 12:45 | Mohan Shelar | Advisory Services | 5 | ☐ |
| Missing FDDs Rpt ← 603 | Equipment wise missing FDDs | 50% ⊗ | 30-01-2019 09:45 | Pranjal Dutta | Onboarding team | 6 | ☐ |

AUTOMATIC FAULT DETECTION AND DIAGNOSTICS IN A BUILDING MANAGEMENT SYSTEM

CROSS-REFERENCE TO RELATED APPLICATIONS

This application is a non-provisional application claiming priority to Indian Provisional Patent Application No. 201921038949, filed Sep. 26, 2019, the disclosure of which is incorporated herein by reference in its entirety.

BACKGROUND

The present disclosure relates generally to building management systems. The present disclosure relates more particularly to Automatic Fault Detection and Diagnostics in a Building Management System.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

SUMMARY

One implementation of the present disclosure is a system for automatic application of fault detection and diagnostics (FDD) rules within a building management system. The system may comprise a processor, a user interface and a memory coupled with the processor, wherein the processor executes a plurality of modules stored in the memory. The plurality of modules may comprise programmed instructions for mapping a plurality of equipment automatically to one or more relevant FDD rules out of a plurality of FDD rules wherein the mapping of the plurality of equipment is enabled by template points available in an equipment out of the plurality of equipment. The plurality of modules may further comprise programmed instructions for implementing the one or more FDD rules to the plurality of mapped equipment present in the building management system. The plurality of modules may further comprise programmed instructions for generating one or more reports based on analysis of association of the one or more FDD rules and the plurality of equipment. The plurality of modules may further comprise programmed instructions for updating one or more FDD rules which are changed after adding and implementing the FDD rules within the building management system.

Another implementation of the present disclosure is a system for a method for automatic application of fault detection and diagnostics (FDD) rules within a building management system. The method may comprise mapping a plurality of equipment automatically to one or more relevant FDD rules out of a plurality of FDD rules wherein the mapping of the plurality of equipment is enabled by template points available in an equipment out of the plurality of equipment. The method may further comprise implementing the one or more FDD rules to the plurality of mapped equipment present in the building management system. The method may further comprise generating one or more reports based on analysis of association of the one or more FDD rules and the plurality of equipment. The method may further comprise updating one or more FDD rules which are changed after adding and implementing the updated FDD rules within the building management system.

In one embodiment, a system for automatic application of fault detection and diagnostics (FDD) rules within a building management system (BMS) comprises a memory having instructions stored thereon and a processor configured to execute the instructions. The processor may execute the instructions to identify, from a plurality of BMS devices, a first BMS device having at least one attribute; identify, from a plurality of FDD rules based on the at least one attribute, an FDD rule associated with the at least one attribute; apply the FDD rule to a first data point of the first BMS device corresponding to the at least one attribute; identify, from the plurality of BMS devices, a second BMS device sharing the at least one attribute; and responsive to identifying the second BMS device sharing the at least one attribute, automatically apply the FDD rule to a second data point of the second BMS device.

In one embodiment, a method for automatic application of fault detection and diagnostics (FDD) rules within a building management system comprises identifying, from a plurality of BMS devices, a first BMS device having at least one attribute. The method may further comprise identifying, from a plurality of FDD rules based on the at least one attribute, an FDD rule associated with the at least one attribute. The method may further comprise applying the FDD rule to a first data point of the first BMS device corresponding to the at least one attribute. The method may further comprise identifying, from the plurality of BMS devices, a second BMS device sharing the at least one attribute. The method may further comprise, responsive to identifying the second BMS device sharing the at least one attribute, automatically applying the FDD rule to a second data point of the second BMS device.

In one embodiment, a method of automatically detecting thresholds for fault detection and diagnostics (FDD) rules in a building management system comprises identifying, from a plurality of BMS devices, a first BMS device having at least one attribute. The method may further comprise identifying, from a plurality of FDD rules based on the at least one attribute, an FDD rule associated with the at least one attribute. The method may further comprise applying the FDD rule to the data point of the first BMS device corresponding to the at least one attribute. The method may further comprise identifying that the FDD rule includes comparing the data point against a threshold. The method may further comprise retrieving a value for the threshold. The method may further comprise assigning the value to the threshold against which the data point is compared under the FDD rule. The method may further comprise, responsive to determining a second BMS device from the plurality of BMS devices shares the at least one attribute, automatically applying the FDD rule, including the threshold having the assigned value, to the second BMS device.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 5 is a user interface of the analytics platform with the plurality of FDD rules section in greater detail is shown, according to some embodiments.

FIG. 6 is a user interface with a table enabled to provide details of automatically generated reports in greater detail is shown, according to some embodiments.

DETAILED DESCRIPTION

Figure 1:
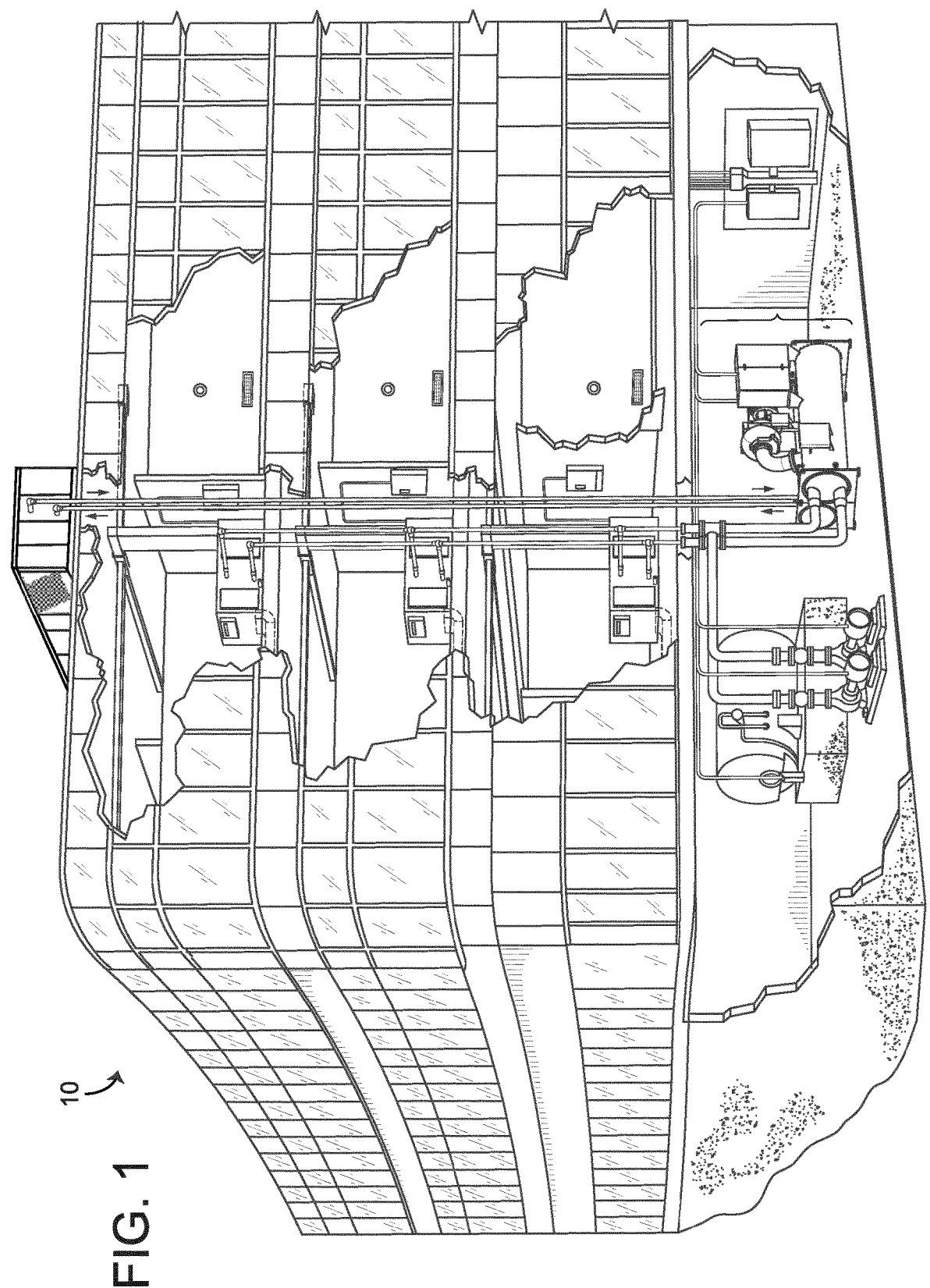
FIG. 1 is a drawing of a building equipped with a building management system (BMS), according to some embodiments.

Conventional building analytics platforms are enabled to detect faults and diagnose the said faults through manual intervention. Users spend a lot of time looking for relevant equipment and point combination to add/enable fault detection and diagnostics (FDD) provided by the BMS platform. This manual work comprises effort and time to assign a plurality of equipment with their relevant fault detection rule. The total time required to complete the said manual work increases with the increase in the number and the type of equipment. The enablement of fault detection and diagnostics rules in the analytical platform is thus a time-consuming manual job.

Moreover, manually assigning FDD rules to equipment may not guarantee the safe triggering of all the rules as the user have limited time for checking each and every equipment and the relevant rule and point combination. Such practice results in triggering of few FDD rules post production and ends the analytics team to invest more time looking for reasons why all assigned FDD rules did not trigger. Furthermore, even if the user checks safe triggering of all FDD rules, it will take a lump sum amount of time and there may be a possibility of missing out the checking of at least one FDD rule.

Current building analytics platforms are not enabled with an easy solution where the users can identify the particular cause when a FDD rule is not triggered and further lack to provide an inbuilt or custom report which is made available directly to the users on the platform to trace the root cause of the fault.

Therefore, there is a long standing need for automatic fault detection and diagnostics via a building analytics platform of a building management system which further saves time of the users by implementation of automatic processes within a system.

Overview

Referring generally to the figures, an automatic fault detection and diagnostics in a building management system is described in accordance with various embodiments of the current subject matter. The building management system is further equipped with a building analytics platform enabled with automatic fault detection and diagnostics (FDD). One or more FDD rules may be automatically applied and enabled within the system without any manual intervention. Furthermore, a plurality of equipment within a building or a structure may be automatically assigned to the relevant FDD rule wherein such assignment does not require manual mapping of the equipment to the relevant FDD rule.

The analytics platform is further enabled to generate one or more reports automatically which is further implemented for analyzing and generating FDD rule wise missing equipment and point report and Equipment or equipment type wise missing FDD rules. Such reports may be provided with the root cause of the detected faults. The automatically generated reports may be sent to a user after predefined time intervals or the frequency of sending such reports may be set on periodic basis.

Building and Building Management System

Referring now to FIG. 1, a perspective view of a building 10 is shown, according to an exemplary embodiment. A building management system (BMS) serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
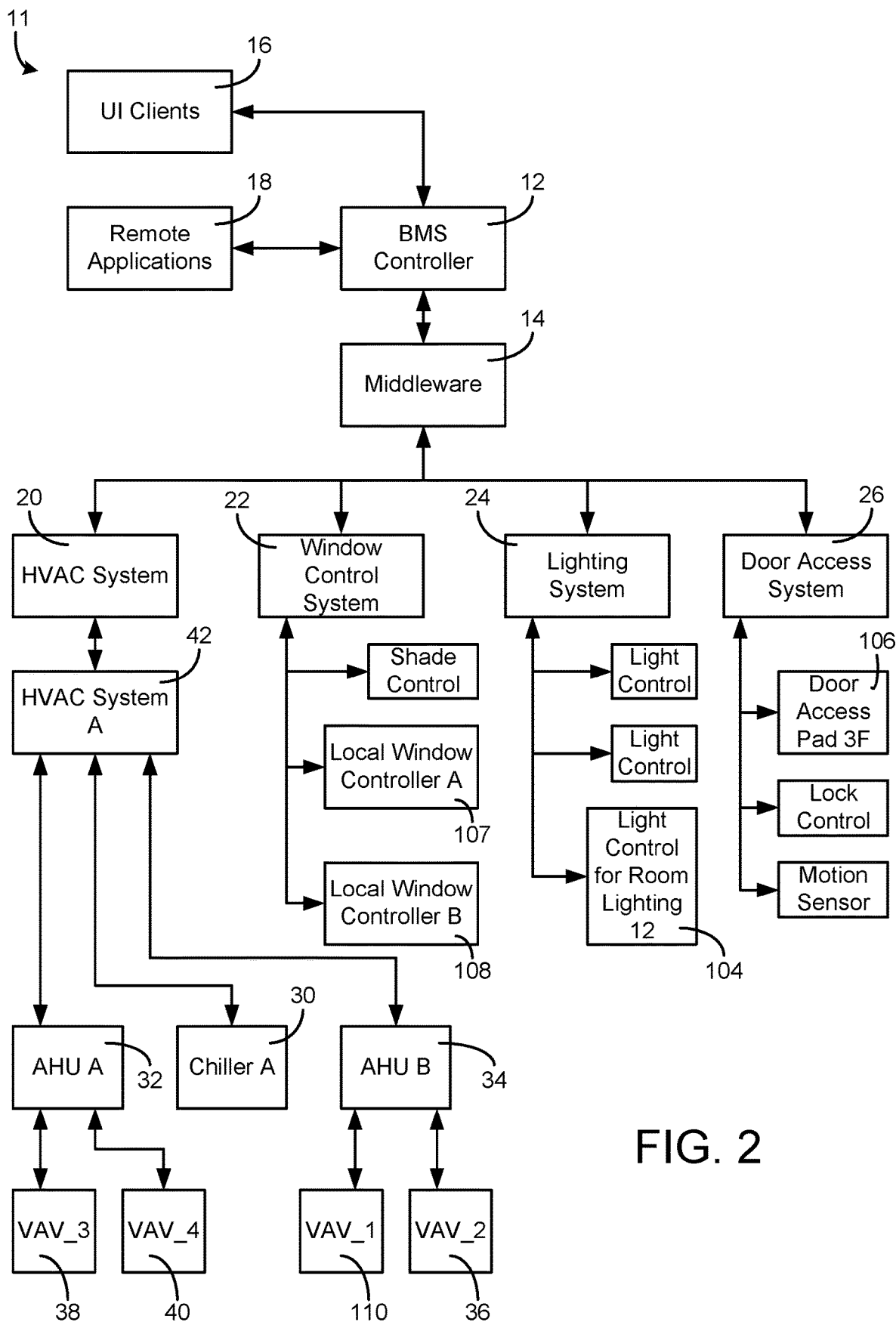
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (also named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
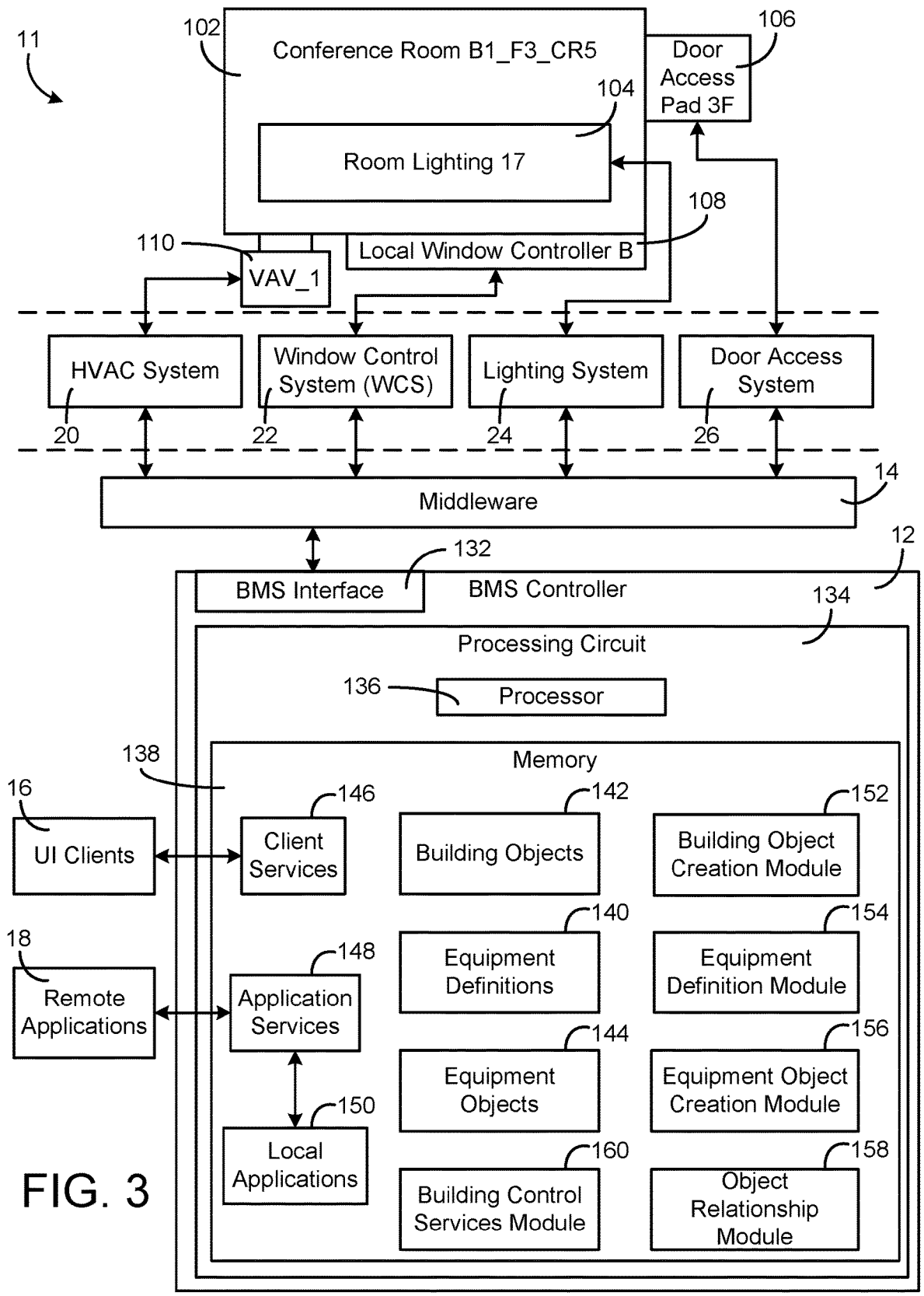
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, the disclosure of which is incorporated herein by reference in its entirety, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated with an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
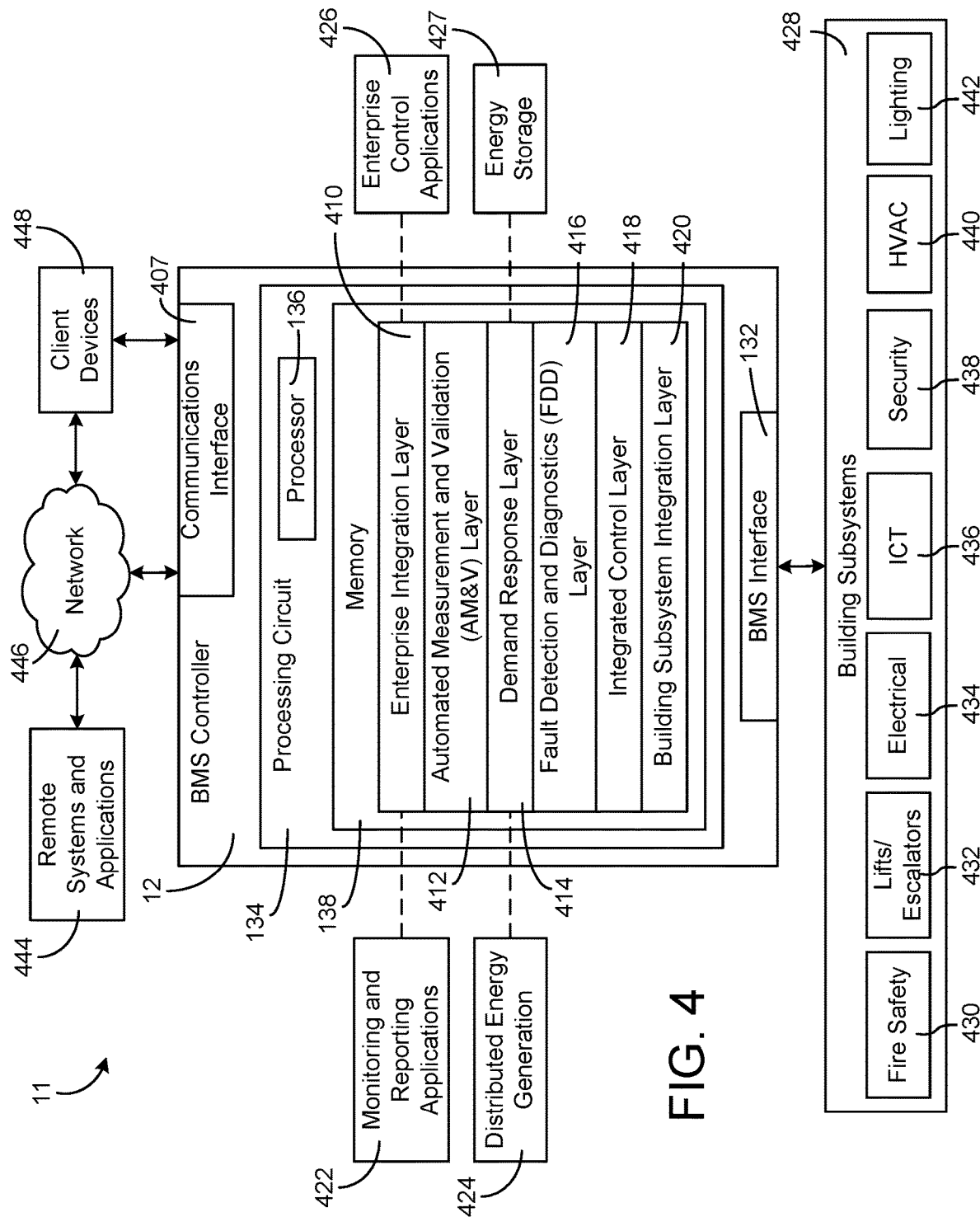
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super system. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Automatic FDD Rule Detection

Referring now to FIG. 5, a user interface 501 of the analytics platform with the plurality of FDD rules section in greater detail is shown, according to some embodiments. The user interface is enabled to provide a detailed overview of the plurality of FDD rules in tabular form when the plurality of FDD rules are implemented in the system. The table may comprise a plurality of columns 502 and a plurality of columns rows 503. The plurality of rows 503 may correspond to the plurality of FDD rules and the plurality of columns 502 may correspond to the details or properties of each of the plurality of FDD rules. The details present in the plurality of columns 502 may comprise but not limited to FDD rule name, FDD description, status of whether Auto-applied or not in Yes or No, checkbox of mapped equipment, priority, category, tag, checkbox of Fault reprocessing, last modified date and time, revision, disable and false positive.

Out of the plurality of FDD rules, the one or more FDD rules which are auto-applied are enabled by default and a disable option is provided if any specific FDD rule is not needed. A plurality of equipment may be automatically mapped to the relevant FDD rule based on the template points available in a particular equipment out of the plurality of equipment. The user may also have an option to update the mapping of the equipment. The column of auto-applied may be added to identify one or more global FDD rules wherein such global FDD rules are automatically added and one or more custom FDD rules are manually added. The last modified column provides information on the latest update made to a particular FDD rule in the system. The information may comprise the date and time of the update. Such update enables to provide the frequency of the FDD rule modifications. The revision column is added to indicate the number of times a FDD rule is changed after adding in the system. The value of 0 in the revision column relates to FDD once auto-applied is good for use and further may not require any modifications. Every column may have a sorting feature at the respective header which may allow the tabular information to sort alphabetically or numerically. The user interface may be enabled with one or more tooltips wherever applicable.

An option 504 to regenerate FDD rules is available on the user interface which when clicked by the user may trigger the analytics platform to re-apply the one or more auto-applied FDD rules. Such process of re-application of the one or more FDD rules is initiated in cases when one or more equipment are deleted or added by the user. The process of regeneration of FDD rules may be cancelled by the provision of a cancel button made available to the user on the user interface. A column of false positives may be highlighted during the rule tuning phase and may be represented in the view. The interface may further be equipped with FDD rule audit trial based on the requirement of the users.

Referring to FIG. 6, a user interface 601 with a table enabled to provide details of automatically generated reports in greater detail is shown, according to some embodiments. The analytics platform is further enabled to generate reports for further analysis of the FDD rules and equipment/point association. The type of report may further comprise a FDD rule wise missing equipment and point report 602 and equipment/equipment type wise missing FDD rules report 603.

In an embodiment, the FDD rule wise missing equipment and point report may comprise the one or more FDD rules which are skipped or not applied to one or more equipment or points. An embodiment of the FDD rule wise missing equipment and point report is described in the Table 1 below.

TABLE 1

Embodiment of the FDD rule wise missing equipment and point report

| | | Equipment & Points Skipped | | |
|---|---|---|---|---|
| ID | FDD | K17-B-FCU-B-2 | J18-L2-FCU-2.1 | J18-L2-FCU-2.2 |
| 1 | Setpoints are out of standard limits | Zone temp SP Fan Run Sts | Zone temp SP Occupancy Sts | Zone temp SP Zone temp |
| 2 | Low Static Pressure | Static press SP Fan Run Sts VSD Output | Static press SP VSD Output | Static press SP Fan Run Sts |
| 3 | Poor Indoor Air Quality | $CO_2$ setpoint $CO_2$ | $CO_2$ $CO_2$ setpoint AHU Run Sts | AHU Run Sts $CO_2$ |
| . . . | | | | |
| 50 | Supply Air Humidity sensor is Faulty | Supply air RH | Supply air RH | Supply air RH |

In another embodiment, the equipment/equipment type wise missing FDD report may comprise the one or more equipment which do not have the application of one or more FDD rules and with available reasons. An embodiment of the equipment/equipment type wise missing FDD report is described in the Table 1 below. Different reports may be generated for different equipment or plant type.

TABLE 2

Embodiment of the equipment/equipment type wise missing FDD report.

| Equipment Name | Location | Building | FDDs Missing | Reason |
|---|---|---|---|---|
| J17-R-AHU-6.1 | Kensington | J17-Ainsworth Building | AHU-FD-001 High Return Air humidity | Supply air fan run status missing |
| | | | AHU-FD-002 High Static Pressure | Static pressure set point missing |
| | | | AHU-FD-003 High Supply Air Temperature in Cooling Mode | Point "Supply air fan output" in OR condition is missing. OR logic doesn't work. |
| J17-R-CH1 | Kensington | F8 Law Building | AHU-FD-003 High Supply Air Temperature in Cooling Mode | Supply air fan run status missing |
| | | | AHU-FD-003 High Supply Air Temperature in Cooling Mode | Supply air temperature set point missing. |

In addition to the equipment/equipment type wise missing FDD report, the analytics engine is enabled to provide special report which provides the list of equipment on which are not applied with at least one FDD rule. This special report enables to identify one or more equipment without any point mapped. An embodiment of the special report is described in Table 3 below.

TABLE 3

Embodiment of the special report.

| Building | Equipment Name | Equipment Type |
|---|---|---|
| J17-Ainsworth Building | J17-R-AHU-6.1 | AHU |
| | J17-R-AHU-6.2 | AHU |
| | J17-R-AHU-6.3 | AHU |
| | J17-R-AHU-6.4 | AHU |
| | F8-B-VAV-1 | VAV |

In yet another embodiment, the report may comprise the root cause which may be mentioned wherever applicable. All the above reports may enable identification of custom rules to be written, required but non-configured points, and potential retrofit opportunities.

Figure 7:
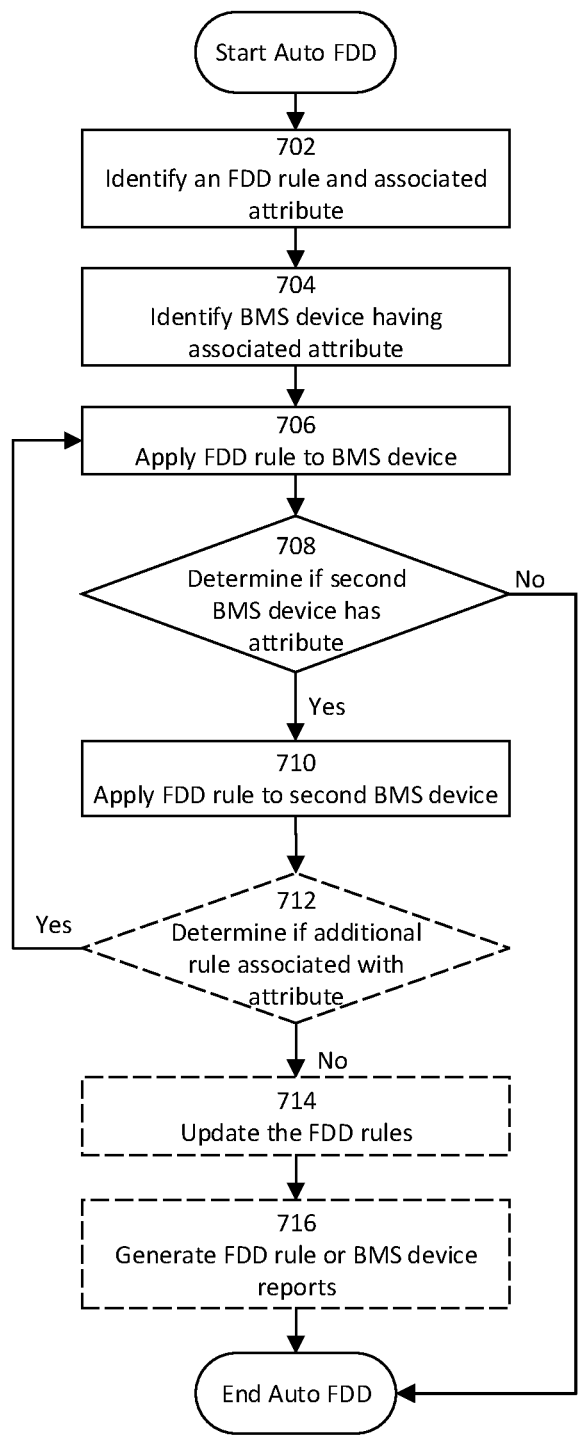
FIG. 7 is a method of implementation of automatic detection and diagnostics rules within a building management system in greater detail is shown, according to some embodiments.

Referring to FIG. 7, a method 700 of implementing automatic fault detection and diagnostics (FDD) rules within a building management system (BMS) in greater detail is shown, according to some embodiments. In some implementations, the method is implemented between an equipment configuration user interface and a rule creation user interface wherein the two user interfaces interact via an auto FDD service, and provides automatic mapping of FDD rules to BMS devices that share particular attributes. For example, a particular type of device, such as a boiler, may have a maximum operating temperature that is stored in the memory. In a building, multiple boilers of the same type and having the same attribute (e.g., maximum operating temperature) may be present for which FDD rules may not be applied. Method 700 determines the BMS devices sharing such an attribute and automatically applies the FDD rules to the data points such that they may be tracked in the future. Method 700 may be implemented by an auto FDD service provided by BMS 11, and may be initiated through an interaction of the user with a user interface such as user interface 501.

Method 700 may begin with a step 702, in which the auto FDD service identifies an FDD rule and an associated attribute. Step 702 may include querying the rule creation interface via an application programming interface to identify FDD rules that map to particular attributes of BMS devices. An FDD rule with such an associated attribute may be, for example, a maximum operating temperature of all boilers, or a set of boilers, present in the building. The FDD rule therefore is the maximum threshold of the operating temperature, with the attribute being the operating temperature. The FDD rule may map to one attribute of the BMS device or may apply to multiple attributes, but for ease of description, only one attribute will be described.

Method 700 may continue with a step 704, which may include the auto FDD service identifying, from a plurality of BMS devices, a BMS device having the associated attribute dictated by the FDD rule. During step 704, a BMS device is identified by querying a database storing information and attributes of the plurality of BMS devices, such as equipment objects 144, using the FDD rule and attribute as query keys. For example, such a BMS device would be a boiler which must comply with the FDD rule which, of course, has a monitored operating temperature. The BMS device may be associated with a data point corresponding to the attribute that can be measured at any time, such as a digital thermometer or other sensor connected to the network and accessible by the user interface. The data point may be a generalized data point or other type of data that maps to an aspect of the BMS device, and represents the attribute of the BMS device for which the identified FDD rule may be applied.

In some embodiments, the FDD rule may apply to a subset of devices, for example, boilers installed on a lower level of the building as opposed to the upper levels. Upon execution of step 704, the auto FDD service may allow the user to input parameters to further limit the BMS devices which identify such a BMS device in response to parameters input by the user during execution of method 700.

Method 700 may continue with a step 706, during which the auto FDD service applies the rule automatically to the identified BMS device. During step 706, the auto FDD service updates the instance of the FDD rule to include a reference to the data point corresponding to the attribute of the BMS device to which the FDD is applied. Step 706 enables the FDD layer 416 to monitor the data point according to the FDD rule, thereby allowing FDD layer 416 to detect faults when the FDD rule is checked, which may occur periodically or upon command.

Method 700 may continue with a step 708, during which the auto FDD service determines whether another BMS device exists having a same attribute for which a data point is mapped. For example, during step 708, the analytics platform would determine, after application of the rule to the first boiler, whether a second boiler exists to which (1) the FDD rule is not currently applied, and (2) the attribute also applies. If another BMS device does not exist (no in step 708), method 700 ends, and may repeat upon the next launch of the auto-FDD application. If another BMS does exist having the same attribute (yes in step 708), method 700 proceeds to a step 710. Step 710 incudes the auto FDD service applying the FDD rule automatically to the other BMS device having the same attribute as that in steps 704 and 706. Method 700 may end with step 710, or may continue to perform the following optional method steps.

In some embodiments of method 700, an optional step 712 may determine whether additional FDD rules apply that are associated with the same attribute. For example, a boiler may also have a minimum operating temperature at which there exists a danger of freezing or a lack of hot water. During step 712, the auto FDD service may identify additional FDD rules to automatically apply to the attribute of the BMS device, thereby resulting in additional references to the corresponding data point of the attribute. Method 700 may end with step 712, or may continue to an additional optional step.

In some embodiments of method 700, an optional step 714 may include the updating the FDD rules by updating a database storing data associated with the plurality of FDD rules. The auto FDD service may obtain the updated rule configuration from the updated database, and may access first database for equipment-point mapping based on the updated rule configuration obtained by FDD service. Method 700 may end with step 714, or may continue to an additional optional step.

In some embodiments of method 700, an optional step 716 may include generating one or more reports. Such reports may include an FDD rule wise missing equipment and point report, equipment/equipment type wise missing FDD rules report and a special report which provides the list of equipment on which are not applied with at least one FDD rule. Method 700 may end with step 716. Method 700 may repeat itself periodically or may maintain a standby state until receiving a command from a user interacting with the user interface.

Figure 8:
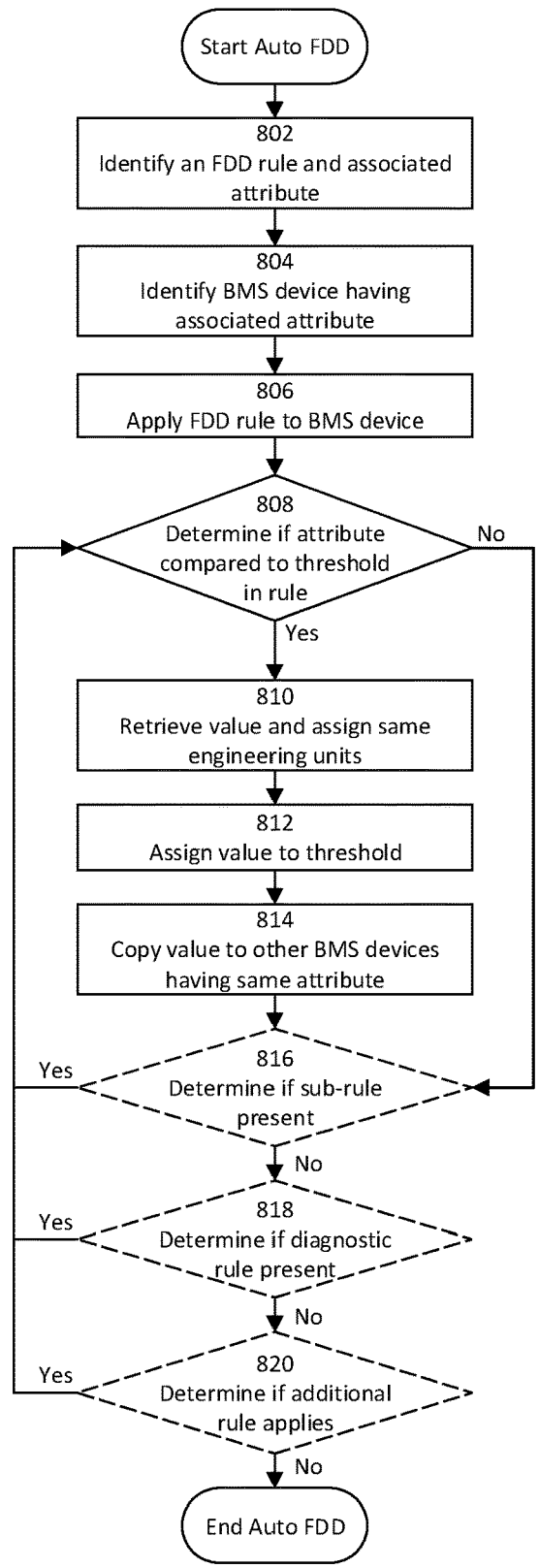
FIG. 8 is a method of implementation of automatically assigning thresholds to FDD rules within a building management system, according to some embodiments.

Referring to FIG. 8, a method 800 for the implementation of automatically assigning thresholds to FDD rules within a building management system, according to some embodiments is illustrated. Method 800 may be implemented between an equipment configuration user interface and a rule creation user interface wherein the two user interfaces interact via an auto FDD service, and utilizes the automatic mapping of FDD rules to BMS devices having associated attributes of method 700 in addition to providing automatic application of threshold values based on attributes. Method 800 identifies FDD rules, associated attributes and BMS devices, and determines that such attributes are compared to particular thresholds as part of the FDD rule, and further identifies the values for said thresholds. Method 800 may be implemented by an auto FDD service provided by BMS 11, and may be initiated through an interaction of the user with a user interface such as user interface 501. Portions of method 800 are substantially similar to that of method 700; as such, any redundant description will be omitted.

Method 800 may begin with a step 802, in which the auto FDD service identifies an FDD rule and an associated attribute. Step 802 may execute in a manner substantially similar to that of step 702 of method 700.

Method 800 may continue with a step 804, in which the auto FDD service identifies, from a plurality of BMS devices, a BMS device having the associated attribute dictated by the FDD rule. Step 802 may execute in a manner substantially similar to that of step 704 of method 700. The associated attributes of the BMS device may have a defined set of engineering units that is stored in memory as part of a point configuration table.

Method 800 may continue with a step 806, during which the auto FDD service applies the rule automatically to the identified BMS device. Step 802 may execute in a manner substantially similar to that of step 706 of method 700.

Method 800 may continue with a step 808, which includes determining whether the attribute of the BMS device is compared to a threshold in the FDD rule being applied to the BMS device. For example, if a value of the data point representing the attribute referenced in the rule is compared to a threshold using a comparative sign such as <, >, or =, step 808 determines yes, and proceeds to a step 810. The threshold may have a name in the form of a string or other identifier under which associated information may be stored in a database that is identified by the auto FDD service. If no such comparison exists in the rule, step 808 determines no and either proceeds to any one of optional steps 816, 818 or 820, or ends method 800. In some embodiments, step 808 may lead into step 708 of method 700.

In step 810 of method 800, the auto FDD service retrieves a value of the threshold to which the data point is being compared and assigns the engineering units of the attribute to the threshold value. In some embodiments, the auto FDD service queries a database to identify the value of the threshold, using the threshold name or identifier obtained in step 808. The database may be a master database including all FDD rules and associated attributes, BMS devices, data points, engineering units and threshold values which the auto FDD service can reference to identify the threshold value associated with the correct FDD rule, attribute and BMS devices.

Method 800 may continue with a step 812, during which the auto FDD service assigns the value retrieved in step 810 to the threshold. Step 812 may include updating data records to reflect the value assignment to the threshold. Method 800 may continue with a step 814, in which the auto FDD service copies or automatically assigns the value of the threshold to other BMS devices having a same attribute to which the FDD rule is mapped. Step 814 may occur very similarly to steps 708 and 710 of method 700, such that the threshold value is assigned to any identical combination of FDD rule, attribute, BMS device and threshold. Method 800 may terminate with step 814, or may continue to any one of optional steps 816, 818 or 820. If method 800 terminates, it may be repeated periodically according to a setting set by the user. Alternatively, the auto FDD service may exist in a standby state until receiving a command to execute method 800.

Method 800 may include optional step 816, during which the auto FDD service may determine whether a sub-rule of the FDD rule is present that is applicable to the attribute. If a sub-rule is present, method 800 may return to step 808 and perform steps 808 through 814 using the attribute and the sub-rule. If a sub-rule is not present, method 800 may terminate or continue to one of optional method steps 818 or 820.

In optional step 818, the auto FDD service may determine whether a diagnostic rule associated with the FDD rule is present that is applicable to the attribute. If such a diagnostic rule is present, method 800 may return to step 808 and perform steps 808 through 814 using the attribute and diagnostic rule. If a diagnostic rule is not present, method 800 may terminate or continue to optional step 820.

In optional step 820, the auto FDD service may determine whether any additional rules apply to the BMS device and associated attribute identified with respect to the initial FDD rule identified in step 802. If no other rules apply, method 800 may terminate. If additional rules do indeed apply, method 800 may return to step 808 and execute steps 808 through 814 for the additional identified rules.

In some embodiments, a combination of both methods 700 and 800 may be executed by the auto FDD service. Such a combination may include the method steps described above in a different order, but may achieve similar results as the embodiments of FIG. 7 and FIG. 8. In addition, the order of method steps in the embodiments of FIG. 7 and FIG. 8 are not limited as such; some embodiments may rearrange the methods steps in any order to achieve similar results, and may omit some steps entirely.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for automatic application of fault detection and diagnostics (FDD) rules within a building management system (BMS), the system comprising:
    a memory having instructions stored thereon; and
    a processor configured to execute the instructions to:
        obtain, via a user interface, user input associating an FDD rule with at least one attribute of a first BMS device, the FDD rule comprising a comparison based on the at least one attribute to determine whether a condition defined by the FDD rule is satisfied;
        apply the FDD rule to a first data point of the first BMS device corresponding to the at least one attribute to create a first instance of the FDD rule comprising a first comparison based on time-varying values of the first data point;
        automatically identify, from a plurality of BMS devices and without requiring user involvement, a second BMS device sharing the at least one attribute;
        responsive to identifying the second BMS device sharing the at least one attribute, automatically apply the FDD rule to a second data point of the second BMS device to create a second instance of the FDD rule different than the first instance of the FDD rule and comprising a second comparison based on time-varying values of the second data point;
        detect one or more faults in the BMS by evaluating the first instance of the FDD rule using the time-varying values of the first data point and evaluating the second instance of the FDD rule using the time-varying values of the second data point; and
        control equipment of the BMS based on the one or more faults detected in the BMS.

2. The system of claim 1, wherein the processor further executes the instructions to, responsive to detecting a change to the comparison of the FDD rule, update at least one of the first comparison of the first instance of the FDD rule or the second comparison of the second instance of the FDD rule.

3. The system of claim 1, wherein the FDD rule comprises a disable property that, when activated, is configured to prevent the processor from automatically applying the FDD rule to the second BMS device.

4. The system of claim 1, wherein the processor further executes instructions to:
    generate a first report identifying one or more FDD rules which are not applied to any of the plurality of BMS devices; and
    generate a second report identifying one or more BMS devices for which no FDD rules are applied.

5. The system of claim 4, wherein the user interface is configured to display an overview of the applied FDD rule and the first or second report generated by the processor.

6. A method for automatic application of fault detection and diagnostics (FDD) rules within a building management system, the method comprising:
    obtaining, via a user interface, user input associating an FDD rule with at least one attribute of a first BMS device, the FDD rule comprising a comparison based on the at least one attribute to determine whether a condition defined by the FDD rule is satisfied;
    applying the FDD rule to a first data point of the first BMS device corresponding to the at least one attribute to create a first instance of the FDD rule comprising a first comparison based on time-varying values of the first data point;
    automatically identifying, from a plurality of BMS devices and without requiring user involvement, a second BMS device sharing the at least one attribute;
    responsive to identifying the second BMS device sharing the at least one attribute, automatically applying the FDD rule to a second data point of the second BMS device to create a second instance of the FDD rule different than the first instance of the FDD rule and comprising a second comparison based on time-varying values of the second data point;
    detecting one or more faults in the BMS by evaluating the first instance of the FDD rule using the time-varying values of the first data point and evaluating the second instance of the FDD rule using the time-varying values of the second data point; and
    control equipment of the BMS based on the one or more faults detected in the BMS.

7. The method of claim 6, wherein the method further comprises, responsive to detecting a change to the comparison of the FDD rule, updating at least one of the first comparison of the first instance of the FDD rule or the second comparison of the second instance of the FDD rule.

8. The method of claim 6, wherein the FDD rule includes a disable property that, when activated, prevents automatically applying the FDD rule to the second BMS device.

9. The method of claim 6, wherein the method further comprises:
generating a first report identifying one or more FDD rules which are not applied to any of the plurality of BMS devices; and
generating a second report identifying one or more BMS devices for which no FDD rules are applied.

10. The method claim 9, wherein the method further comprises displaying an overview of the applied FDD rule and the first or second report.

11. A method of automatically detecting thresholds for fault detection and diagnostics (FDD) rules in a building management system, the method comprising:
obtaining, via a user interface, user input associating an FDD rule with at least one attribute of a first BMS device, the FDD rule comprising a comparison based on the at least one attribute to determine whether a condition defined by the FDD rule is satisfied, and comprising a FDD threshold having an undefined value;
applying the FDD rule to a first data point of the first BMS device corresponding to the at least one attribute to create a first instance of the FDD rule comprising the FDD threshold having the undefined value;
retrieving a defined value for the FDD threshold after creating the first instance of the FDD rule;
assigning the defined value to the FDD threshold in the first instance of the FDD rule;
responsive to determining a second BMS device from the plurality of BMS devices shares the at least one attribute, automatically applying the FDD rule, including the FDD threshold having the defined value, to a second data point of the second BMS device to create a second instance of the FDD rule comprising the FDD threshold having the defined value, the second instance of the FDD rule different than the first instance of the FDD rule;
detecting one or more faults in the BMS by evaluating the first instance of the FDD rule using time-varying values of the first data point and evaluating the second instance of the FDD rule using time-varying values of the second data point; and
controlling equipment of the BMS based on the one or more faults detected in the BMS.

12. The method of claim 11, wherein the FDD rule comprises a main rule, a sub-rule, and a diagnostic rule defining different aspects of the FDD rule.

13. The method of claim 12, further comprising:
identifying that the sub-rule or diagnostic rule includes a sub-threshold or diagnostic threshold having an undefined value;
retrieving a defined value for the sub-threshold or diagnostic threshold; and
assigning the defined value to the sub-threshold or diagnostic threshold in the first instance of the FDD rule.

14. The method of claim 11, further comprising assigning, by a processor, engineering units of the at least one attribute to the FDD threshold.

15. The method of claim 14, further comprising creating, by the processor, a dataset structured as a table in a database in which the FDD rule is associated with at least one of the first data point, the second data point, the threshold, the engineering units, the undefined value, the first BMS device, or the second BMS device.

16. The method of claim 11, further comprising, responsive to detecting a change to the comparison of the FDD rule, updating at least one of a first comparison of the first FDD rule or a second comparison of the second FDD rule, the first comparison based on the time-varying values of the first data point and the second comparison based on the time-varying values of the second data point.

17. The method of claim 11, wherein the FDD rule includes a disable property that, when enabled, prevents automatically applying the FDD rule to the first data point of the first BMS device.

18. The method of claim 11, wherein the method further comprises:
generating one or more reports based on analysis of association of a plurality of FDD rules and a plurality of BMS devices, the one or more reports comprising:
a first report identifying one or more FDD rules which are not applied to a data point of a BMS device; and
a second report identifying one or more BMS devices for which no FDD rules are applied to data points thereof.

19. The method of claim 18, wherein the method further comprises displaying, on the user interface, an overview of the FDD rule and the one or more reports.

20. The method of claim 11, wherein retrieving the defined value for the FDD threshold comprises retrieving, from a database, the defined value from a data table associated with the BMS.

* * * * *